United States Patent [19]

Lie et al.

[11] Patent Number: 5,081,664
[45] Date of Patent: Jan. 14, 1992

[54] X-RAY MEASUREMENT APPARATUS FOR THE MEASUREMENT OF X-RAY DOSES AND ACCELERATION VOLTAGE

[75] Inventors: Ging H. Lie; Christinus A. P. Van Liempd; Franciscus Schmal; Erik Sies, all of Eindhoven, Netherlands

[73] Assignee: U.S. Philips Corporation, New York, N.Y.

[21] Appl. No.: 513,742

[22] Filed: Apr. 24, 1990

[30] Foreign Application Priority Data

Apr. 26, 1989 [NL] Netherlands ............... 8901048

[51] Int. Cl.$^5$ ............................................ G01D 18/00
[52] U.S. Cl. ............................. 378/207; 250/370.07; 250/370.01; 378/98
[58] Field of Search ............... 378/207, 109, 108, 110, 378/111, 112, 98; 250/252.1, 369, 370.07, 370.01

[56] References Cited

U.S. PATENT DOCUMENTS

| | | | |
|---|---|---|---|
| 4,070,581 | 1/1978 | Gibbons et al. | 250/445 |
| 4,442,496 | 4/1984 | Simon et al. | 250/252.1 |
| 4,843,619 | 6/1989 | Sheridan | 378/207 |
| 4,880,981 | 11/1989 | Johnston | 250/369 |
| 4,916,727 | 4/1990 | Sheridan | 378/207 |
| 4,942,596 | 7/1990 | Eberhard et al. | 378/109 |

OTHER PUBLICATIONS

Brochure—"The Nero 6000B Makes X-ray Machine Performance Studies as Easy as Possible . . . ," 6 pages, 1985.

Primary Examiner—Edward P. Westin
Assistant Examiner—Kim-Kwok Chu
Attorney, Agent, or Firm—William Squire

[57] ABSTRACT

A compact X-ray measurement apparatus is realized for dose as well as energy measurements by using an X-ray detector comprising scintillation crystals coupled to photodiodes. To this end, the current generated by the photodiodes is periodically applied to an integrator and the photodiode is charged across its intrinsic capacitance during sampling and reset periods of the integrator. Loss of charge is thus avoided and a low X-ray dose can be measured. The X-ray measurement apparatus can be calibrated by calibration of the photodiodes.

15 Claims, 2 Drawing Sheets

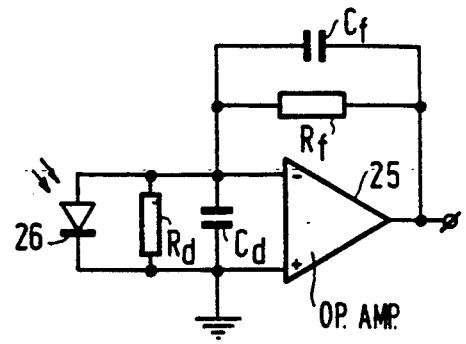
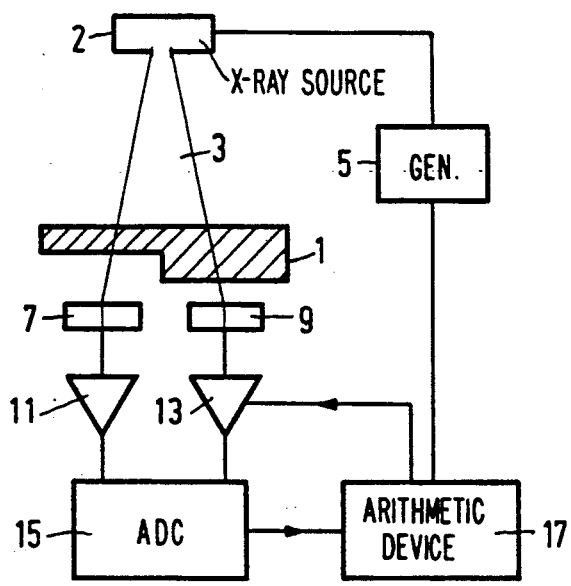
FIG.3
FIG.1
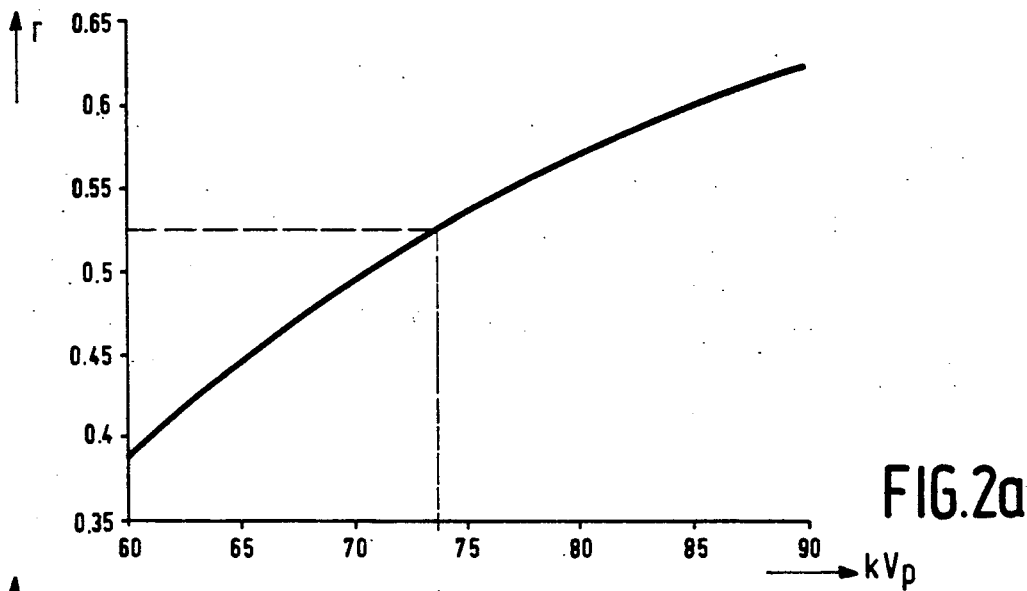
FIG.2a
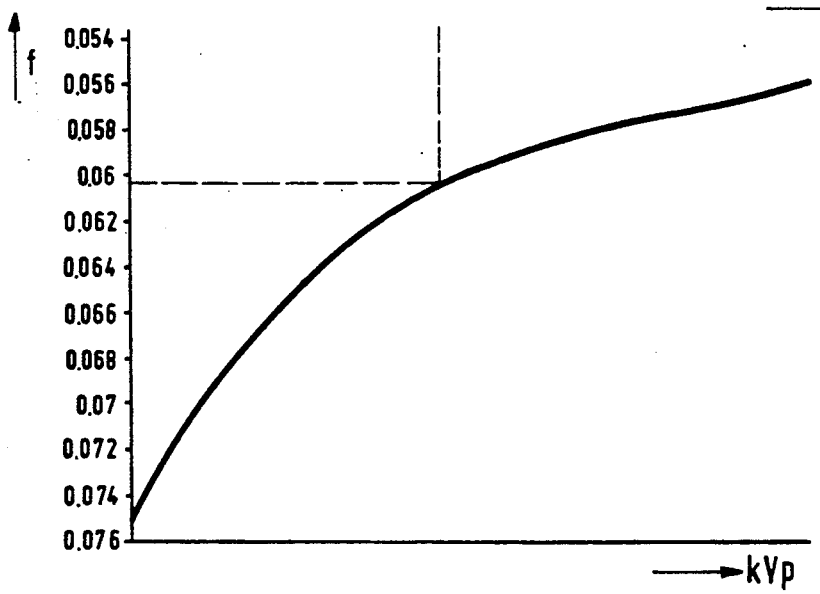
FIG.2b

X-RAY MEASUREMENT APPARATUS FOR THE MEASUREMENT OF X-RAY DOSES AND ACCELERATION VOLTAGE

FIELD OF THE INVENTION

The invention relates to an X-ray measurement apparatus for the detection of X-rays to be emitted by an X-ray source, comprising at least two detectors, at least two X-ray absorbing filters which can be arranged between the X-ray source and the detectors and which have different transmission coefficients, amplifier circuits for amplifying measurement signals to be generated by the detectors, and an arithmetic device for determining the intensity and energy of the X-rays from the measurement signals, each of the detectors comprising a scintillation crystal whereto a photodiode is optically coupled, each of the amplifier circuits comprising an integrator circuit which includes an operational amplifier, an output signal of which is fed back to an inverting input of the operational amplifier by way of capacitive feedback.

BACKGROUND OF THE INVENTION

An X-ray measurement apparatus of this kind is known from U.S. Pat. No. 4,442,496.

The cited Patent Specification describes an X-ray measurement apparatus whereby radiation properties of a radiation source, notably an X-ray tube, can be measured. X-rays are generated in an X-ray tube by exposing an anode to an electron beam. The maximum energy of the X-rays is determined by the maximum voltage whereby the electrons are accelerated in the X-ray tube, so that the acceleration voltage of the X-ray tube can be determined from the radiation spectrum of the X-rays. When the X-ray source is used for the irradiation of objects, the radiation dose received by the object is determined not only by the duration of the exposure, but also by the radiation energy. The radiation energy is dependent on the peak value of the acceleration voltage which is often pulse-shaped. When patients are irradiated for the formation of radiographic or fluoroscopic images, exact correspondence is required between the adjusted acceleration voltage and the voltage actually present in the X-ray tube in order to achieve high-quality and safe imaging, considering the detrimental effects of high radiation doses on the human body and the influencing of the imaging contrast by the energy of the X-rays. To this end, calibration of the peak value of the adjusted acceleration voltage, referred to hereinafter as kVp, will be necessary at regular intervals. Because the acceleration voltages amount to some tens of kV in an X-ray tube, direct measurement of the acceleration voltage is cumbersome. When use is made of a relation between the energy of the X-rays and the kVp value, a kVp value can be indirectly derived by measurement of the spectrum of the X-rays. When a filter is irradiated, a radiation beam is attenuated inter alia by the photoelectric effect and compton scattering, these interactions of X-rays and matter are dependent on the energy of the X-rays. When a beam of X-rays having an intensity $I_o$ is incident on an object having a thickness d in the direction of irradiation, a beam having an intensity I, given by $I = I_o \exp(-\mu(E) \times d)$, emanates from the object. Therein, $\mu(E)$ is the energy-dependent linear attenuation coefficient. For a large variety of materials the variation of $\mu(E)$ as a function of the energy is accurately known on the basis of measurements. When a radiation beam having an intensity $I_o$ is incident on two filters having a different thickness, $d_1$ and $d_2$, respectively, the logarithm of the quotient of the radiation intensities detected beyond the filters produces a value for $\mu(E) \times (d_2 - d_1)$. For the linear attenuation coefficient found an associated energy value of the X-ray beam can be looked up in a table or graph.

In addition to the measurement of the radiation energy, in the case of pulsed operation of the X-ray source the pulse shape can also be determined from the detector signals. This operation provides inter alia information concerning the operation of the acceleration voltage generator. Another important quantity to be determined is the overall dose delivered by the source. This dose is measured in röntgen, one röntgen corresponding to the amount of radiation that produces $2.08 \times 10^9$ ion pairs per cm$^3$ of air at standard pressure and temperature. This corresponds to an energy deposition of $0.85 \times 10^{-2}$ jKg$^{-1}$. For the measurement of the kVp values of the X-ray source it suffices when a maximum value can be detected for the signals produced by the detectors, so that the measurement of the kVp can be executed by means of detectors formed by photodiodes which are optically coupled to a scintillation crystal. The conversion of low light levels into an electric signal by the photodiodes and the low currents involved, being in the order of magnitude of 100 pA, do not impede these measurements. However, for dose measurements, a stronger signal amplification or a more sensitive detector will be required in order to enable also the measurement of low doses, notably when the X-ray source is used in the fluoroscopy mode. Known X-ray measurement apparatus, for example as described in a leaflet published by Victoreen Inc., Cleveland, Ohio, in 1985, concerning the "Nero 6000 B", use an air-filled ionization chamber as a detector for dose measurements, a measurement current thereof being a measure of the dose rate which is per definition measured in Rs$^{-1}$. Because the amount of ionized air, and hence the sensitivity of the detector, depends on the volume of the ionization chamber, these detectors have comparatively large dimensions (some tens of cm$^3$). The possibility of using such X-ray measurement apparatus in an automatic control mode in which dose and kVp are measured during fluoroscopy of an object, their measurement values being used in a control circuit for readjustment of the X-ray source, is not optimum, because of the comparatively large dimensions of the X-ray detector, without appreciable distortion of the X-ray image.

SUMMARY OF THE INVENTION

It is an object of the invention to provide a compact and robust X-ray measurement apparatus for the measurement of X-ray doses and kVp values which is suitable for measuring comparatively low dose rates (10 $\mu$Rs$^{-1}$ – 10 mRs$^{-1}$).

To achieve this, an X-ray measurement apparatus in accordance with the invention is characterized in that a measurement signal is applied to the input of an integrator circuit by closing a first switch.

When all detectors are constructed as scintillation crystals to which a photodiode is optically coupled, a small detector is obtained which is robust because of the absence of an ionization chamber having a thin and vulnerable entrance window. Moreover, for an X-ray measurement apparatus in accordance with the invention the effect of air humidity and ambient temperature on the accuracy of the measurements of the X-ray detector is less than when use is made of an ionization chamber. The measurement signals are applied directly to the integrator without prior amplification. Because of the use of a capacitive feedback, stability problems which occur, for example during amplification by feedback of the output signal across a comparatively large feedback resistance in order to obtain a high gain, are avoided. The measurement signals of the photodiodes are integrated across the feedback capacitor during an integration period (for example, 10 ms) which is determined by the duration of closure of the first switch, so that an output voltage of the integrator is proportional to the mean detector current. After the opening of the first switch, the charge accumulated on the capacitive feedback is applied to a storage (sample and hold) capacitor and the capacitive feedback later discharged by closing a second switch connected parallel to the capacitive feedback. During this reset period (for example, 10 $\mu$s) and during the sample time (for example 10 $\mu$s) the photodiode is charged across its intrinsic capacitance. Subsequently, when the first switch is closed the photodiode transfers its charge to the capacitive coupling.

It is to be noted that an X-ray measurement apparatus comprising a detector in the form of scintillation crystals which are optically coupled to photodiodes and also comprising an integrator circuit with a capacitive feedback is known per se from German Auslegeschrift DE 26 30 961 which corresponds to U.S. Pat. No. 4,070,581.

The cited Auslegeschrift describes how the measurement signals are integrated across a feedback capacitor by means of an integrator circuit. The output signal of the integrator circuit is proportional to the mean input current. The drawback of this circuit consists in that during the discharging of the capacitive coupling a loss occurs in the charge generated in the photodiode during the discharge period. Thus, accurate measurement of the overall charge generated in the photodiode is impeded.

When the amplifier circuit is constructed as a CMOS integrated circuit, the first and, the second switches are utilized to minimize charge losses and a highly temperature-stabilized capacitive feedback can be realized.

In an embodiment of an X-ray measurement apparatus in accordance with the invention the X-ray measurement apparatus comprises a light source for exposure of the photodiodes.

Because the scintillation material has an output efficiency which is stable in time, for the calibration of the detectors it suffices to calibrate the photodiodes with the associated amplifier circuit. When use is made of a light source which applies an accurately known amount of light to the photodiode, calibration can be performed comparatively easily without making use of a separate radioactive calibration source. The problems involved in the storage and transport of the calibration source are then avoided and, moreover, a routine check can be performed prior to use of the X-ray measurement apparatus.

In a further embodiment of an X-ray measurement apparatus in accordance with the invention the arithmetic device comprises means for determining, in the case of pulsed operation of the X-ray source, a pulse frequency and a pulse width by Fourier analysis of at least one of the measurement signals.

For the measurement of pulse widths and pulse frequencies of the acceleration voltage, for example during the execution of a rapid succession of exposures (cineoperation), the arithmetic device incorporates a Fourier algorithm for determining the power density spectrum of the acceleration voltage by Fourier transformation of one of the measurement signals. The period T and the mean value $V_{av}$ of the detector signals can be determined from the power density spectrum. The pulse width W is given by the relation:

$$V_{max} \cdot W = V_{av} \cdot T$$

Therein, $V_{max}$ is the highest value of the measurement signal.

BRIEF DESCRIPTION OF THE DRAWING

Some embodiments in accordance with the invention will be described in detail hereinafter with reference to the accompanying drawing. Therein:

FIG. 1 diagrammatically shows an X-ray measurement apparatus in accordance with the invention, FIGS. 2a and 2b show a graph of values contained in a table in the arithmetic device, FIG. 3 shows an integrator circuit comprising a feedback resistance.

DETAILED DESCRIPTION OF THE PREFERRED EMBODIMENT

Figure 4:
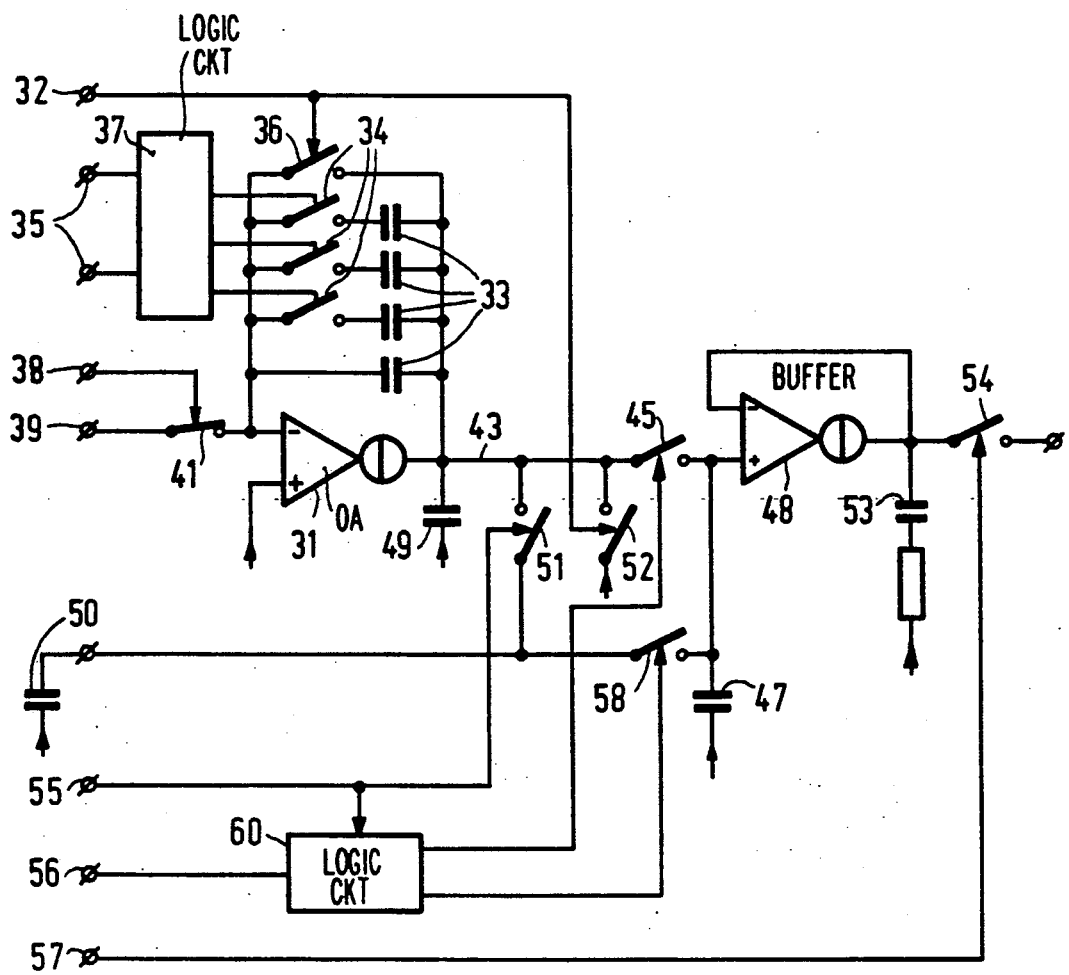
FIG. 4 shows an amplifier circuit comprising a capacitive feedback.

FIG. 1 shows an X-ray source 2 which is powered by a high-voltage generator 5. In the X-ray source 2 a filament cathode (not shown in the Figure) emits electrons which are accelerated by the acceleration voltage so as to be incident on an anode, thus releasing X-rays. Part of the X-rays forms a beam 3 which is incident on a filter 1, detectors 7 and 9 being disposed behind the filter. The detectors 7 and 9 each comprise a scintillation crystal, for example CDWO4 (cadmium tungstanate) which converts the energy of the X-rays into light. The light emitted by the scintillation crystals releases charge carriers in respective photodiodes in the detectors, thus producing a diode current which is amplified in respective amplifier circuits 11 and 13. The amplified signals are applied to an AD converter 15 (ADC) which applies the digitized measurement signals to an arithmetic device 17. In the arithmetic device 17 an energy of the X-rays is determined from the ratio of the measurement output signals of the two detectors. The arithmetic device 17 calculates a kVp value of the X-ray source and a dose delivered by the source. On the basis of these values the kVp adjustment of the acceleration voltage generator 5 can be corrected or the acceleration voltage generator 5 can be switched off after a maximum dose has been exceeded.

The graph of FIG. 2a represents a table which is stored in the arithmetic device 17 and which contains ratio values r of the measurement output signals of the detectors 7 and 9 and the associated acceleration voltages in kVp. FIG. 2b shows the conversion factors f (the reciprocal of the sensitivity) of the detectors 7 and 9 as a function of kVp in $\mu Rs^{-1}/mV$. The detector output signals are multiplied by the conversion factor in order to obtain a value for the dose rate. For any ratio r of the measurement signals a conversion factor f can be found by combination of the graph 2a and the graph 2b as shown by the dashed lines of FIGS. 2a and 2b. Using the value of r in FIG. 2a, a KVp value is found which is used to find the value of f in FIG. 2b.

FIG. 3 shows a known current/voltage converter for the measurement of small currents. To this end, the output signal of an operational amplifier 25 is applied to the inverting input via a feedback resistance $R_f$. In a first approximation, the output voltage of the amplifier 25 equals the product of an input current and the feedback resistance $R_f$. A photodiode 26 produces a current which is proportional to an incident light intensity and which may amount to, for example 100 pA. In order to obtain a measurement voltage of 1 V on the output of the amplifier 25, a feedback resistance $R_f$ amounting to 10 GΩ is required. Such high resistances are difficult to realize because of problems relating to temperature stability and dimensions. From a point of view of thermal noise an as high as possible value of the feedback resistance $R_f$ is desired. Because the standard deviation $\Delta$ of the thermal noise is proportional to $R_f^{0.5}$, the relative noise in an output signal $V_0$ (being proportional to $R_f$) decreases as $R_f^{-0.5}$. The photodiode 26 behaves as a current source with a parallel resistance $R_d$ in the order of magnitude of 10 MΩ and a parallel capacitance $C_d$ in the order of magnitude of 500 pF. For a value $R_f$ of, for example 100 MΩ, in combination with a frequency response of the operational amplifier 25 of −6 dB per octave, this results in a rather unstable circuit. One way of enhancing the stability is to connect a feedback capacitor $C_f$ parallel to $R_f$, so that $R_f C_f = R_d \cdot C_d$. By using a purely capacitive feedback instead of a feedback resistance $R_f$, problems as regards the stability of the circuit are avoided.

FIG. 4 shows a diagram of an amplifier circuit which is constructed as a CMOS integrated circuit and which comprises an operational amplifier 31 whose output 43 is fed back to the inverting input by four capacitors 33 selectively connected in parallel by switches 34. The switches 34 for the capacitors 33 are connected to a logic circuit 37. A capacitor 49 is connected to the output 43 of the amplifier 31. An external capacitor 50 is connected, parallel to the capacitor 49, to the output 43 by closing a switch 51. A switch 58 is closed by a logic circuit 60 so that the capacitor 50 is connected parallel to a storage capacitor 47. The output 43 is connected to the non inverting input of a buffer circuit 48 by closing the switch 45 via logic circuit 60. The storage capacitor 47 is coupled to the non inverting input of the buffer circuit 48. An output signal is derived from the buffer circuit 48 output by closing switch 54 by way of a voltage on the terminal 57. Switches 34 are closed by input signals on terminals 35 of the logic circuit 37. The amplification magnitude of the input signal of the amplifier 31 on terminal 39 is adjusted by connecting more or less capacitors 33 in parallel via switches 34. The measurement output signal of a detector (not shown in the Figure) is applied to the terminal 39. The switch 41 is closed by way of a control voltage on the terminal 38, the input signal then being integrated over one or more of the selected ones of capacitors 33. By closing the switch 41 for an integration period T, the output signal on the output 43 of the amplifier 31 will be a voltage $V_o$ which is proportional to the mean signal current $I_{av}$ according to:

$$V_o = I_{av} \times T/C_f$$

Therein, $C_f$ is the capacitance value of the combination of the capacitors 33. The gain can be increased by prolonging the integration time T or by reducing the capacitance value $C_f$ by opening one or more of the switches 34. Upon expiration of an integration period, the switch 41 is opened and the signal present on the output 43 is sampled and held across the storage capacitor 47 by closure of the switch 45 under the control of a signal present on the terminal 56. Subsequently, the capacitors 33 are discharged by closing the switch 36 and the capacitors 47 and 50 are discharged by closing the switch 52. The switches 36, 41 and 45 introduce noise in the signal $V_o$. The standard deviation $\Delta_n$ of the noise is given approximately by $$\Delta_n = (3kt/C_f)^{0.5}$$

(capacitors $C_d$, 47 and 49 much larger than capacitor (capacitors) 33 and the voltage noise of the amplifier 31 is negligibly small).

Therein, t is the temperature and k is Boltzmann's constant. The standard deviation is independent of the resistance of the switches which changes upon closing and opening, and hence independent of the integration time. For the signal-to-noise ratio N it follows that:

$$N = TI_{av}/(3ktC_f)^{0.5}$$

If the voltage noise of the amplifier 31 is not negligibly small, the signal-to-noise ratio can be improved by limiting the bandwidth of the amplifier 31 by addition of the capacitor 50 via the switch 51.

Figure 5:
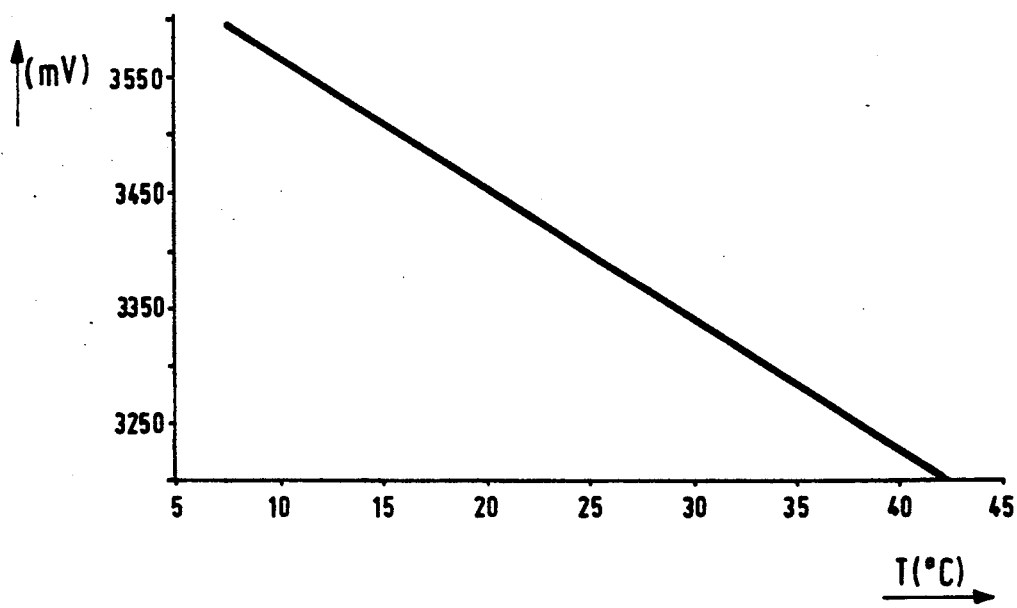
FIG. 5 shows a graph illustrating the measured temperature dependency of the X-ray measurement apparatus.

When the amplifier circuit is constructed using discrete components, a large circuit will be obtained with a comparatively high temperature sensitivity and susceptibility to noise due to parasitic capacitances. When the amplifier circuit is constructed as an integrated circuit with CMOS transistors, an amplifier will be obtained with a very small bias current and offset voltage, the thermal stability of the feedback capacitance being very high. FIG. 5 shows the measured relationship between the temperature t and the detector signals originating from a CMOS amplifier circuit. The temperature variation is caused by the scintillation crystal and the photodiode. The effect of the amplifier 31 on the temperature variation is negligibly small. Because of the substantially linear variation of the gain as a function of temperature, temperature compensation can be readily performed during the processing of the measurement signals in the arithmetic unit 17.

We claim:

1. An X-ray measurement apparatus for the measurement of X-rays emitted by an X-ray source, comprising at least two detectors, at least two X-ray-absorbing filters each between the X-ray source and a corresponding different one of the detectors and which filters have different transmission coefficients, said detectors each generating a corresponding measurement signal, a plurality of amplifier circuits each for amplifying the measurement signals generated by the detectors, each amplifier circuit corresponding to a different detector, each circuit producing an output measurement signal, and an arithmetic device for determining the intensity and the energy of the X-rays from the amplified output measurement signals from said circuits, each of the detectors comprising a scintillation crystal to which a photodiode is optically coupled, each of the amplifier circuits comprising an integrator circuit which includes an operational amplifier having an output signal, said operational amplifier output signal being fed back to an inverting input of the operational amplifier by way of solely capacitive feedback, and switch means for selectively applying a measurement signal to the input of the corresponding integrator circuit, said switch means being in the open state during the determining of the output signal of said integrator circuit by said arithmetic device.

2. An X-ray measurement apparatus as claimed in claim 1 wherein said capacitance feedback includes second switch means for selectively changing the value of said capacitance feedback.

3. An X-ray measurement apparatus as claimed in claim 1 including third switch means and a storage capacitor for applying said amplifier output signal to said storage capacitor for storing said amplifier output signal.

4. An X-ray measurement apparatus as claimed in claim 1, wherein the capacitive feedback comprises two or more capacitors selectively connected in parallel.

5. An X-ray measurement apparatus as claimed in claim 1, wherein the amplifier circuit comprises an integrated circuit including CMOS transistors.

6. An X-ray measurement apparatus as claimed in claim 1, wherein the X-ray measurement apparatus comprises a light source for exposure of the photodiodes.

7. An X-ray measurement apparatus as claimed in claim 6, wherein the light source is formed by a light emitting diode.

8. An X-ray measurement apparatus as claimed in claim 1, wherein the arithmetic device comprises means for determining, during pulsed operation of the X-ray source, a pulse frequency and a pulse width by Fourier analysis of at least one of the measurement signals.

9. An X-ray measurement apparatus as claimed in claim 2, including third switch means for storing said output signal in a storage capacitor.

10. An X-ray measurement apparatus as claimed in claim 2, characterized in that the capacitive feedback comprises two or more capacitors selectively connected in parallel.

11. An X-ray measurement apparatus as claimed in claim 3, characterized in that the capacitive feedback comprises two or more capacitors selectively connected in parallel.

12. An X-ray measurement apparatus as claimed in claim 4, wherein the amplifier circuit comprises an integrated circuit including CMOS transistors.

13. An X-ray measurement apparatus as claimed in claim 5, wherein the X-ray measurement apparatus comprises a light source for exposure of the photodiodes.

14. An X-ray measurement apparatus as claimed in claim 7, wherein the arithmetic device comprises means for determining, during pulsed operation of the X-ray source, a pulse frequency and a pulse width by Fourier analysis of at least one of the measurement signals.

15. In an X-ray measurement apparatus for measurement of X-rays emitted by an X-ray source, said apparatus including filtering means for filtering said emitted X-rays with filters having different transmission coefficients, means for detecting the filtered X-rays including photodiodes for producing signals representing said detected X-rays, means for amplifying said produced signals and means responsive to the amplified signals for determining the intensity and energy of the emitted X-rays, said amplifier means comprising:

integrated circuit means including operational amplifier means having solely capacitive feedback means; and switch means for selectively coupling said integrated circuit means to said means for detecting and to said means for determining for amplifying said produced signals during sampling of said produced signals and for selectively decoupling said integrated circuit means from said means for detecting when said means for determining said intensity and energy is coupled to said integrated circuit means.

* * * * *